(12) United States Patent
Xi (10) Patent No.: US 9,170,699 B2
(45) Date of Patent: Oct. 27, 2015

(54) INDUCTIVE TOUCH SCREEN AND IN CELL INDUCTIVE TOUCH SCREEN

(71) Applicant: Shanghai AVIC Optoelectronics Co., Ltd., Shanghai (CN)

(72) Inventor: Kerui Xi, Shanghai (CN)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 56 days.

(21) Appl. No.: 14/062,757

(22) Filed: Oct. 24, 2013

(65) Prior Publication Data

US 2014/0333574 A1    Nov. 13, 2014

(30) Foreign Application Priority Data

May 8, 2013 (CN) .......................... 2013 1 0170095

(51) Int. Cl.
*G06F 3/046* (2006.01)
*G06F 3/041* (2006.01)

(52) U.S. Cl.
CPC .............. *G06F 3/046* (2013.01); *G06F 3/0412* (2013.01)

(58) Field of Classification Search
CPC ......... G06F 3/041; G06F 3/046; G06F 3/044; G06F 3/0412
USPC ........................................... 178/18.07–18.08
See application file for complete search history.

(56) References Cited

U.S. PATENT DOCUMENTS

| 2003/0127704 | A1* | 7/2003 | Kobayashi et al. | 257/531 |
|---|---|---|---|---|
| 2004/0189587 | A1* | 9/2004 | Jung et al. | 345/102 |
| 2010/0265190 | A1* | 10/2010 | Rofougaran | 345/173 |
| 2011/0122055 | A1* | 5/2011 | Lee | 345/92 |
| 2011/0248934 | A1* | 10/2011 | Yeh et al. | 345/173 |
| 2011/0285454 | A1* | 11/2011 | Bayramoglu | 327/517 |
| 2013/0271399 | A1* | 10/2013 | Liu | 345/173 |

FOREIGN PATENT DOCUMENTS

| CN | 101526679 A |   | 9/2009 |
|---|---|---|---|
| CN | 101526679 A | * | 9/2009 |
| JP | 2008084222 A |   | 4/2008 |

* cited by examiner

*Primary Examiner* — Sanjiv D Patel
(74) *Attorney, Agent, or Firm* — Alston & Bird LLP (57) ABSTRACT

An inductive touch screen is disclosed. Embodiments include a transparent substrate and a conductive layer. The conductive layer includes helical-shaped patterns, and inductive lines electrically connected with the patterns. The patterns form inductive electrodes and output inductive signals through the inductive lines, and the inductive lines include first and second inductive lines. The inductive electrodes includes rows of first sub-electrodes and rows of second sub-electrodes, where the first and second sub-electrodes are arranged alternately in a column direction. Each of the first inductive lines is electrically connected with a row of the first sub-electrodes, and each of the second inductive lines is electrically connected with the second sub-electrodes in a same column. The touch screen further includes a drive line on the substrate, and the drive line is electrically connected with the inductive electrodes to provide the touch screen with a drive signal.

14 Claims, 6 Drawing Sheets

INDUCTIVE TOUCH SCREEN AND IN CELL INDUCTIVE TOUCH SCREEN

CROSS-REFERENCES TO RELATED APPLICATIONS

The present application claims priority to Chinese patent application No. 201310170095.7, entitled "INDUCTIVE TOUCH SCREEN AND IN CELL INDUCTIVE TOUCH SCREEN", filed with the State Intellectual Property Office of People's Republic of China on May 8, 2013, the contents of which is incorporated herein by reference in its entirety.

FIELD

The present invention relates to the field of touch screens and particularly to an inductive touch screen and an in cell inductive touch screen.

BACKGROUND OF THE INVENTION

At the present time, people are increasingly interested in a touch screen instead of a mouse or a keyword along with the development of touch technologies. The touch screen performs an operation by detecting the location of a touch by a user to thereby achieve human-machine interaction. Specifically the coordinates of a touch point and further the location of a touch are determined by detecting and comparing variations of signals in respective detection units in the touch screen. The existing touch screen technologies generally include resistive, capacitive, photosensitive and inductive technologies. Along with the development of these technologies, a touch screen is further integrated with a display device. Taking liquid crystal displays as an example, the liquid crystal displays integrated with touch screens are generally divided into in cell technologies and on cell technologies according to whether the touch screens are integrated inside or outside liquid crystal cells. An in cell technology indicates that a touch screen is integrated inside a liquid crystal cell, and an on cell technology indicates that a touch screen is integrated outside a liquid crystal cell. Particularly in a capacitive touch screen, an inductive line based on charge induction may have some influence upon orientation of liquid crystal molecules, and other electric signals in the liquid crystal display may also interfere with the inductive line so that induction sensitivity of the inductive line may be lowered and, the inductive line tends to fail to work and causes a considerable power consumption of the panel as well. In a resistive touch screen, the thickness of a liquid crystal cell tends to vary, thus resulting in a deteriorated display effect. A photosensitive touch screen poses a stringent requirement on brightness, thus easily resulting in a low touch precision and other problems. Therefore inductive touch screen technology has gradually become a research focus.

Figure 1:
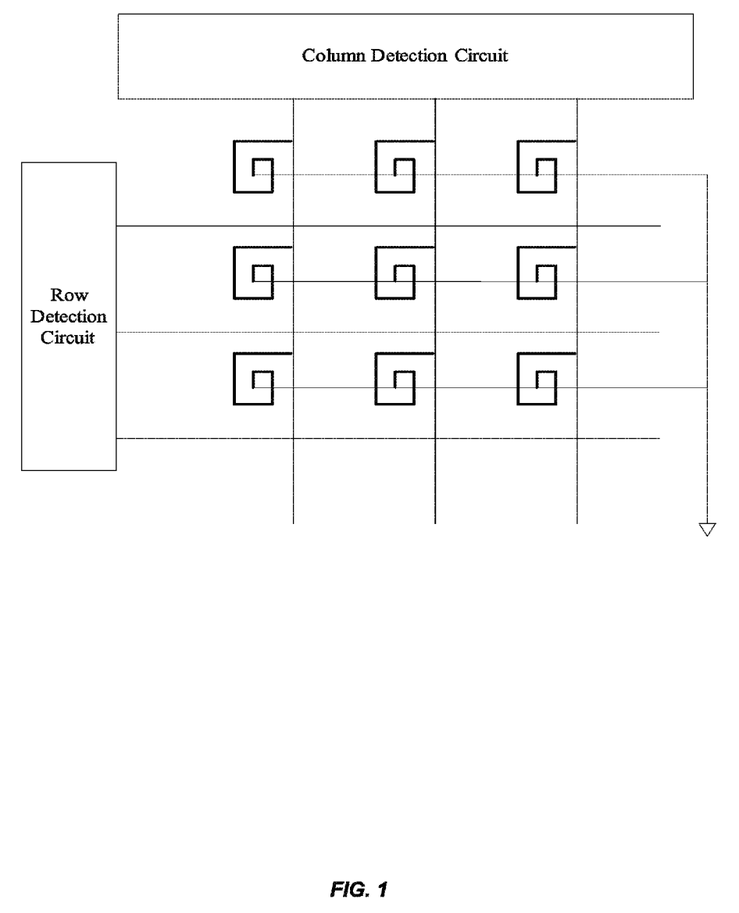
FIG. 1 is a schematic structural diagram of inductive electrodes of an inductive touch screen and a drive and detection circuit thereof in the prior art.
Figure 2:
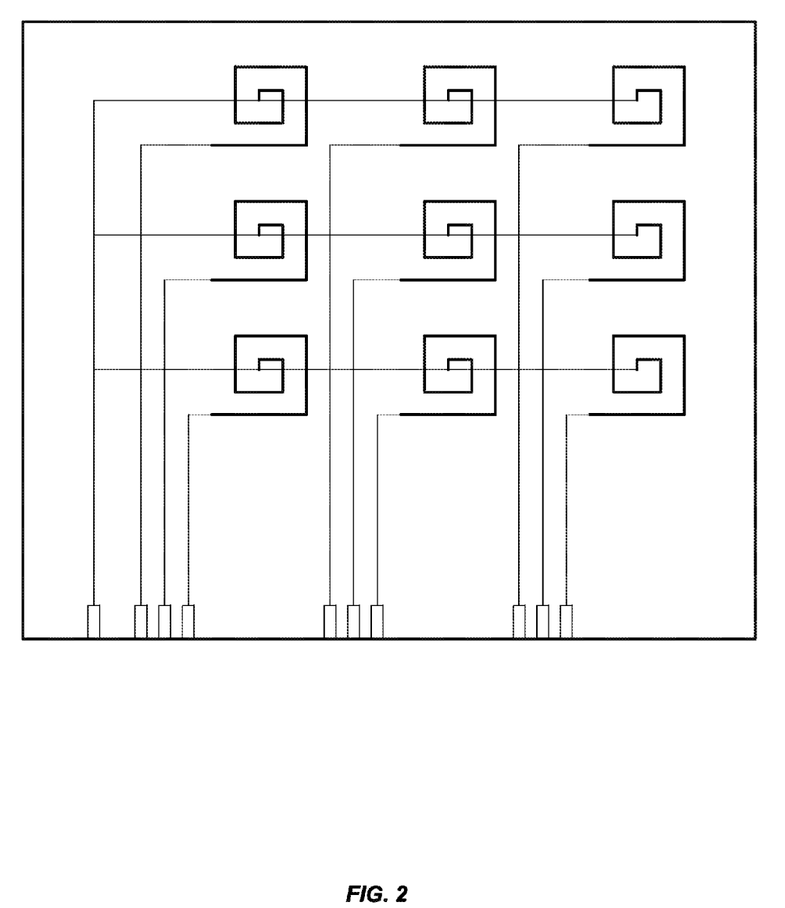
FIG. 2 is a schematic structural diagram of inductive electrodes of another inductive touch screen and a drive and detection circuit thereof in the prior art.

In the existing inductive touch screen, both touch electrodes in column and touch electrodes in row respectively share one inductive line as illustrated in FIG. 1. The inductive lines of the electrodes in one row and in one column are connected together, and crosstalk may occur with an inductive signal, thus making it difficult to detect a touch. In order to avoid such a problem of signal crosstalk between rows and columns, such a solution is proposed in the prior art as illustrated in FIG. 2 that an inductive line is arranged separately for each inductive electrode to transmit an inductive signal. However a pad for transmitting the inductive signal has to be arranged separately in a peripheral area of a panel in correspondence to each inductive line, and this requires a large area to be spared on the periphery of the panel for arranging these pads for transmitting inductive signals, and a large number of pads discourages the area of the panel from being utilized efficiently and also contradicts with the development trend of a panel with a narrow border.

BRIEF SUMMARY OF THE INVENTION

Another inventive aspect is an inductive touch screen. The touch screen includes a transparent substrate, and a conductive layer on the substrate. The conductive layer includes helical-shaped first patterns, and inductive lines electrically connected with the first patterns. The first patterns form inductive electrodes and output signals through the inductive lines. The inductive lines include first and second inductive lines. The inductive electrodes include rows of first sub-electrodes and rows of second sub-electrodes, where the first and second sub-electrodes are arranged alternately in a column direction. Each of the first inductive lines is electrically connected with a row of the first sub-electrodes, and each of the second inductive lines is electrically connected with the second sub-electrodes in a same column. The touch screen further includes a drive line on the transparent substrate, and the drive line is electrically connected with the inductive electrodes to provide the touch screen with a drive signal.

Another inventive aspect is an in cell inductive touch screen. The touch screen includes a first substrate, a second substrate arranged in opposition to the first substrate, and a conductive layer on an inner side of the first substrate. The conductive layer includes a plurality of helical-shaped first patterns and a plurality of inductive lines electrically connected with the first patterns. The first patterns form inductive electrodes arranged in an array and are configured to output inductive signals through the plurality of inductive lines. The touch screen also includes a drive line on the inner side of the first substrate, the drive line being electrically connected with the inductive electrodes to provide the in cell touch screen with a drive signal.

BRIEF DESCRIPTION OF THE DRAWINGS

FIG. 6b is a schematic sectional view along the line M-M in FIG. 6a;

FIG. 7b is a schematic sectional view along the line N-N in FIG. 7a; and

DETAILED DESCRIPTION OF THE INVENTION

In order to make the foregoing objects, features and advantages of the invention more apparent, particular embodiments of the invention will be described below in details with reference to the drawings.

Numerous specific details will be set forth in the following description in order to facilitate full understanding of the invention, but the invention can be embodied in other modes than those described below, so the invention will not be limited to the particular embodiments disclosed below.

First Embodiment

Figure 3:
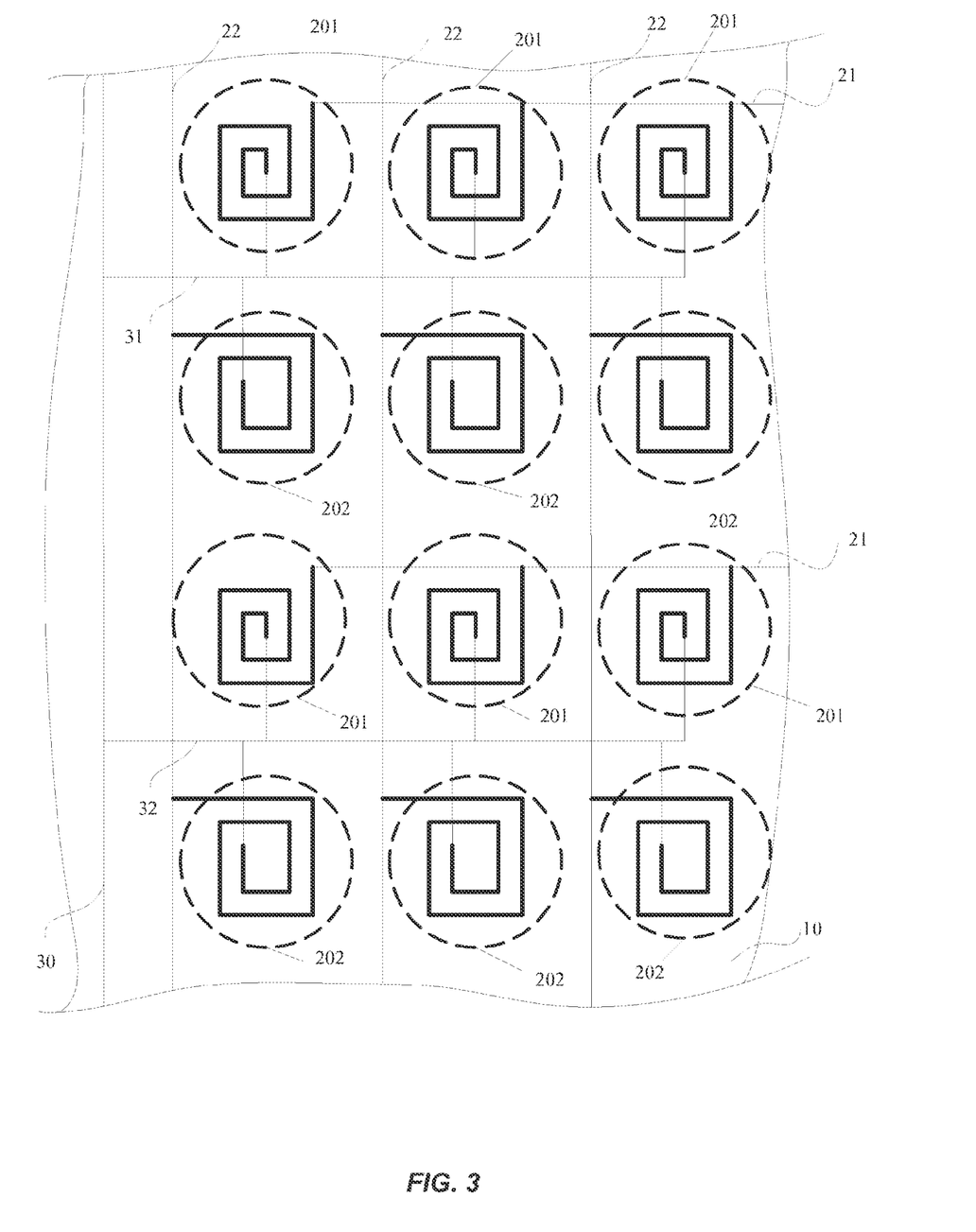
FIG. 3 is a schematic structural diagram of inductive electrodes and a drive and detection circuit thereof according to a first embodiment of the invention.

The first embodiment of the invention provides an inductive touch screen as illustrated in FIG. 3 including a transparent substrate 10 and a conductive layer on the transparent substrate 10, where the conductive layer includes a plurality of helical-shaped first patterns and a plurality of inductive lines electrically connected with the first patterns, and the first patterns form inductive electrodes arranged in an array and output inductive signals through the plurality of inductive lines. Particularly the plurality of inductive lines include a plurality of first inductive lines 21 and a plurality of second inductive lines 22 electrically insulated from the first inductive lines 21. The array of inductive electrodes includes a plurality of rows of first sub-electrodes 201 and a plurality of rows of second sub-electrodes 202, and the first sub-electrodes 201 and the second sub-electrodes 202 are arranged alternately in the column direction. Each first inductive line 21 is electrically connected with a row of the first sub-electrodes 201 and each second inductive line 22 is electrically connected with the second sub-electrodes 202 in a same column. Moreover the touch screen further includes a drive line 30 on the transparent substrate 10 and the drive line 30 is electrically connected with the inductive electrodes to provide the touch screen with a drive signal.

In the touch screen according to this embodiment, each of the inductive lines (including the first inductive lines 21 and the second inductive lines 22) forms with the drive line 30 a loop through one of the plurality of helical-shaped inductive electrodes (including the first sub-electrodes 201 and the second sub-electrodes 202). When a touching object with a magnetic field, e.g., a magnet, approaches a helical-shaped inductive electrode (equivalent to a coil), a magnetic flux of the inductive electrode (the coil) in a period of time $\Delta t$ varies by $\Delta \Phi$, and then there is an inductive electromotive force $\xi = N*\Delta\Phi/\Delta t$, wherein N represents the number of turns of the coil. Then inductive current can be derived as $I=\xi/R$, wherein R represents an equivalent resistance of the inductive electrode (the coil). A coordinates of a touch point can be correspondingly detected, that is, the location of a touch point can be got, from the apparent varies in inductive current in a row direction and in a column direction.

In this embodiment, since the inductive electrodes are arranged into the first sub-electrodes 201 and the second sub-electrodes 202, and each first inductive line 21 is electrically connected with a row of first sub-electrodes 201 while each second inductive line 22 is electrically connected with the second sub-electrodes 202 in a same column, there will be no mutual interference between an inductive signal in a row direction and an inductive signal in a column direction. And also the solution in which an inductive line is arranged separately for each of the inductive electrodes can reduce the number of pads, each of which corresponds to one of the inductive lines, avoiding occupying a considerable space on the periphery of a panel.

Preferably each of the inductive electrodes has two terminals, one of which is electrically connected with an inductive line and the other of which is connected with the drive line 30 as illustrated in FIG. 3 so as to transmit a signal.

Figure 4:
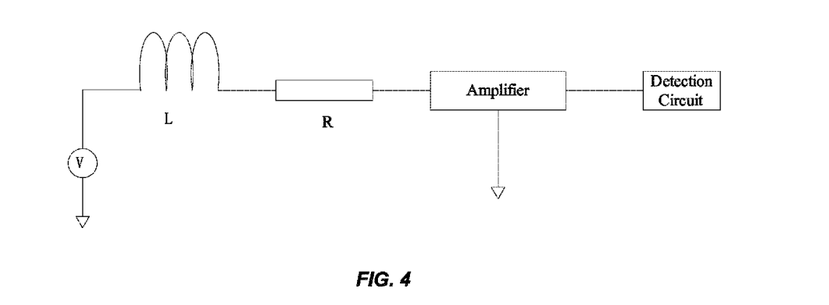
FIG. 4 is an equivalent circuit diagram of a touch screen structure in the first embodiment of the invention.

Preferably one terminal of each of the inductive lines is connected with an amplification circuit and further a detection circuit to amplify an obtained inductive signal. Specifically the first inductive lines 21 each have one terminal electrically connected with the first sub-electrode 201 and the other terminal electrically connected with the amplification circuit and further the detection circuit. The second inductive lines 22 each have one terminal electrically connected with the second sub-electrode 202 and the other terminal electrically connected with the amplification circuit and further the detection circuit. An equivalent circuit of a drive signal being input from the drive line 30 and transmitted through one inductive electrode to one of the inductive lines from which a corresponding inductive signal is output is as illustrated in FIG. 4.

Furthermore as illustrated in FIG. 3, the drive line 30 includes a plurality of sub-drive lines 31, 32, ..., each of the sub-drive lines is electrically connected with a row of the first sub-electrodes 201 and a row of the second sub-electrodes 202, and a different row of the first sub-electrodes 201 or the second sub-electrodes 202 is electrically connected with a different sub-drive line. Thus the number of drive lines can be reduced and wiring of the panel can be optimized.

Furthermore the drive line 30 according to the embodiment of the invention can be either connected with an external voltage signal or grounded so that the inductive touch screen according to the embodiments of the invention is of an active type or a passive type.

It shall be noted that this embodiment will not be limited to a particular type of inductive touch screen. Taking an touch screen integrated with a liquid crystal display as an example, the touch screen in this embodiment can be of a plug-in type, that is, the inductive touch screen is integrated separately on the outside of a liquid crystal cell; or can be of a on cell type, that is, the inductive touch screen is integrated on the outside of a color filter substrate of a liquid crystal cell, where the color filter substrate is used as a transparent substrate of the inductive touch screen; or can be of an in cell type, that is, the inductive touch screen is integrated on the inside of a color filter substrate of a liquid crystal cell.

Moreover the "row" direction and "column" direction as referred to in this embodiment are defined relative to each other, and those skilled in the art can swap the arrangements of the electrodes and the arrangements and connection relationships of the corresponding drive lines or inductive lines in these two directions without departing from the scope of this embodiment, and this embodiment will not be limited to the particular configuration as described above.

Second Embodiment

Figure 5:
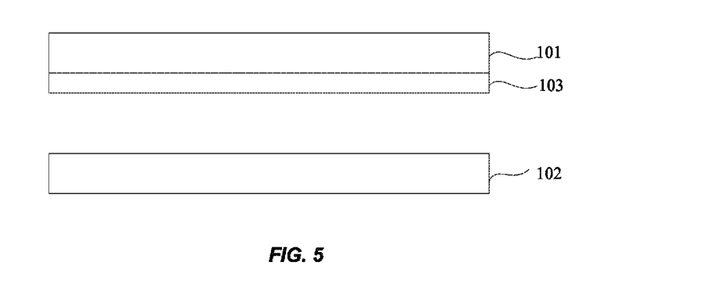
FIG. 5 is a schematic structural diagram of a touch screen structure according to a second embodiment of the invention.

This embodiment further provides an in cell inductive touch screen as illustrated in FIG. 5 including a first substrate 101 and a second substrate 102 arranged in opposition to the first substrate 101. The in cell inductive touch screen further includes a conductive layer 103 on the inside of the first substrate 101, wherein the conductive layer 103 includes a plurality of helical-shaped first patterns and a plurality of inductive lines electrically connected with the first patterns, and the first patterns form inductive electrodes arranged in an array and output inductive signals through the plurality of inductive lines. The in cell inductive touch screen further includes a drive line arranged on the inner side of the first substrate, the drive line being electrically connected with the inductive electrodes to provide the in cell inductive touch screen with a drive signal.

Figure 6A:
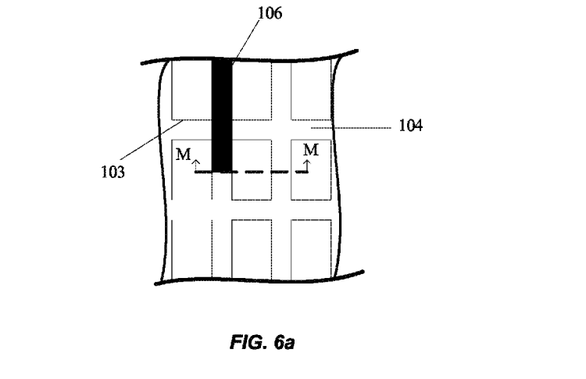
FIG. 6a is a schematic top view of a touch screen structure in the second embodiment of the invention.
Figure 6B:
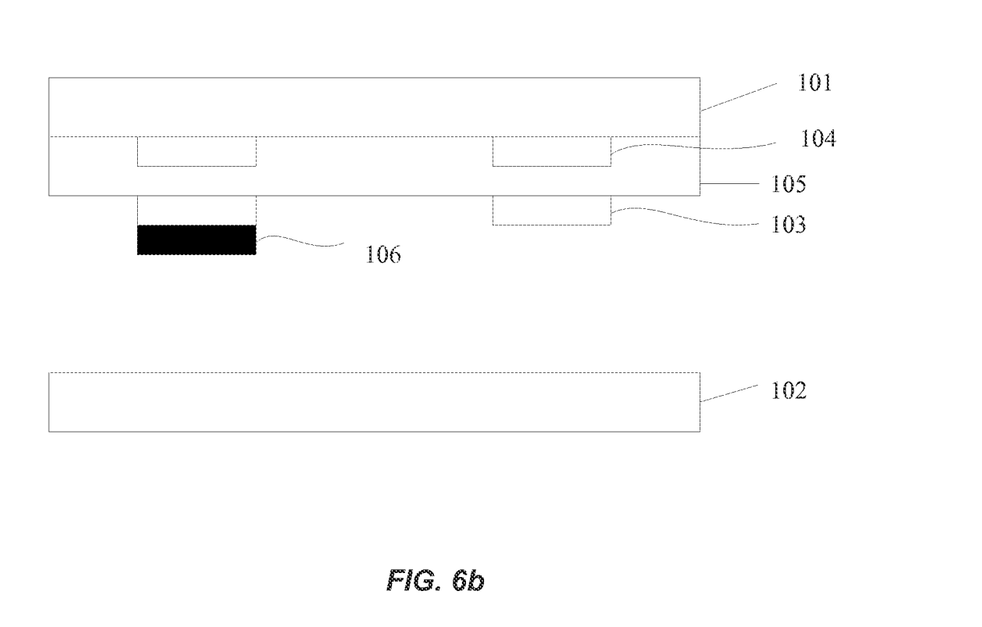

Specifically the in cell inductive touch screen further includes a light shielding layer 104 on the inside of the first substrate 101 and electrically insulated from the conductive layer 103, as illustrated in FIG. 6a and FIG. 6b, where the projection of the conductive layer 103 in the light transmission direction falls into an area the light shielding layer 104 occupying. Preferably the inductive touch screen further includes a drive line 106 on the inner side of the first substrate 101, the drive line 106 being electrically connected with the conductive layer 103 to apply a drive signal to the inductive electrodes in the conductive layer 103.

It shall be noted that FIG. 6a schematically illustrates only one turn of coil formed by an inductive electrode but in practice there can be plurality of turns of helical-shaped coil without being limited to FIG. 6a. FIG. 6b schematically illustrates the conductive layer 103 being electrically insulated from the light shielding layer 104 by an insulation film 105, but those skilled in the art can appreciate that this embodiment will not be limited thereto as long as the conductive layer 103 can be electrically insulated from the light shielding layer 104 in any way, for example, the insulation film 105 does not cover the first substrate 101 but only covers the light shielding layer 104, so this embodiment will not be limited to FIG. 6b. Moreover the conductive layer 103 can be closer to the second substrate 102 than the light shielding layer 104 or the light shielding layer 104 can be closer to the second substrate 102 than the conductive layer 103 as long as the projection of the conductive layer 103 in the light transmission direction falls into an area the light shielding layer 104 occupying, and this embodiment will not be limited to FIG. 6b.

This embodiment provides an in cell inductive touch screen in which a display and an inductive touch screen are integrated to make the display device with touch function thinner in terms of the overall thickness thereof, meet the development requirement of a lowered weight and thinner in thickness of the display device with touch function and greatly reduce the overall thickness of the device.

Preferably in this embodiment, the conductive layer 103 can be further embodied in the structure of a conductive layer described in the first embodiment, and in addition to the implementation of the in cell inductive touch screen, signal interference between rows and columns in the in cell inductive touch screen can be further reduced without increasing an area occupied by pads in a peripheral area of the substrate.

Third Embodiment

Figure 7A:
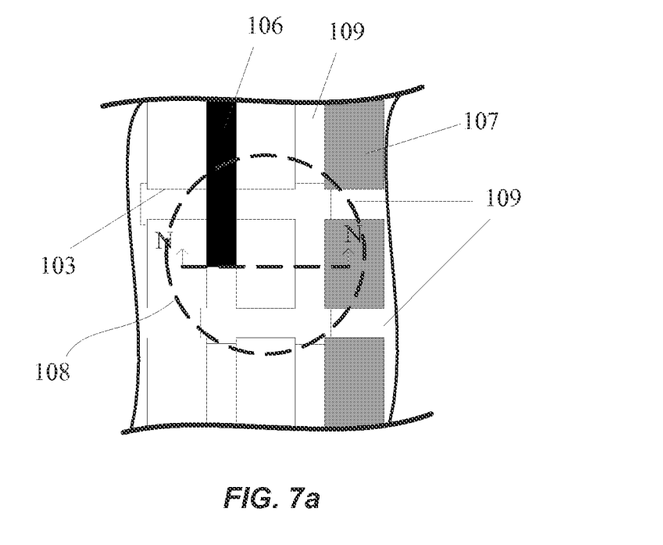
FIG. 7a is a schematic top view of a touch screen structure according to a third embodiment of the invention.
Figure 7B:
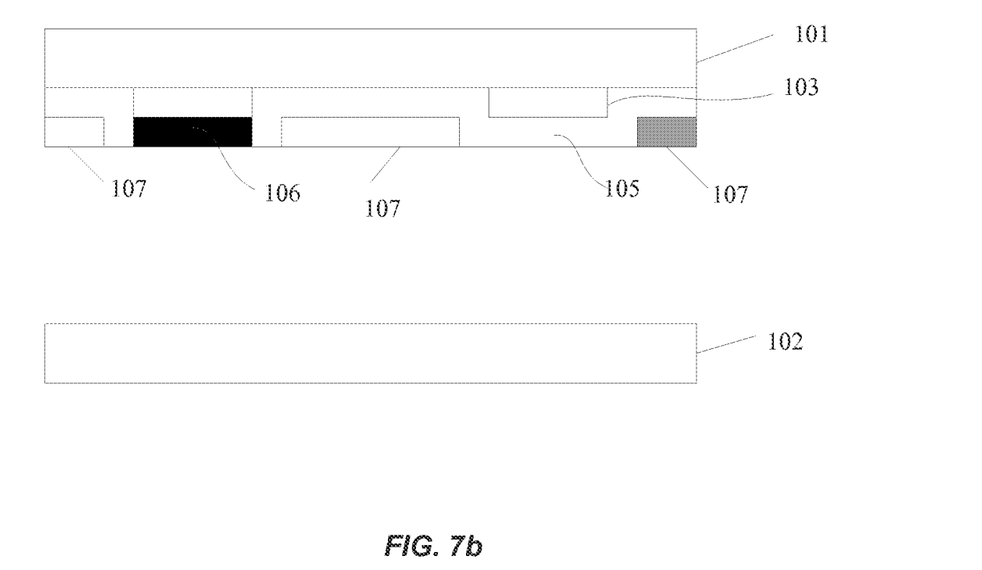

This embodiment proposes an in cell inductive touch screen as illustrated in FIG. 7a and FIG. 7b, including a first substrate 101 and a second substrate 102 arranged in opposition to the first substrate 101. The in cell inductive touch screen further includes a conductive layer 103 on the inside of the first substrate 101, wherein the conductive layer 103 includes a plurality of helical-shaped first patterns 108 and a plurality of inductive lines (not illustrated in FIGS. 7a and 7b) electrically connected with the first patterns, and the first patterns 108 form inductive electrodes arranged in an array and output inductive signals through the plurality of inductive lines. The in cell inductive touch screen further includes a drive line 106 on the inside of the first substrate 101, the drive line 106 being electrically connected with the inductive electrodes to provide the in cell inductive touch screen with a drive signal.

Specifically referring to FIG. 7a and FIG. 7b, the conductive layer 103 is a light shielding layer, and the conductive layer 103 further includes a plurality of second patterns 109 electrically insulated from the plurality of the first patterns 108 and the plurality of the inductive lines. And the in cell inductive touch screen further includes an insulation layer 105 covering the conductive layer 103, and the drive line 106 is located on the insulation layer 105 and electrically connected with the inductive electrodes through via holes in the insulation layer 105.

The difference between this embodiment and the second embodiment is that the light shielding layer itself is a conductive layer and a structure of a separate conductive layer is omitted to thereby further reduce the overall thickness of a device integrating a touch screen and a display, and further accommodate the requirements of a lowered weight and thinner in thickness of the device.

It shall be noted that for clarity of the description, a first pattern 108 and a second pattern 109 are cut off to achieve insulation from each other in FIG. 7a, but the first patterns 108 and the second patterns 109 may be electrically insulated from each other in alternative ways, and this embodiment will not be limited to the structure illustrated in FIG. 7a.

Preferably as illustrated in FIG. 7a and FIG. 7b, the in cell inductive touch screen can further include color films 107 on the insulation layer 105. The color films 107 can include a regular red (R), green (G) or blue (B) color film or a color film in other colors, e.g., a yellow (Y) color film, a composite color film, etc., and this embodiment will not be limited thereto.

The light shielding layer described in the second and the third embodiment can be of a light-tight electrically conductive material, e.g., an organic substance doped with carbon powder, or preferably metal in the embodiment of the invention.

The drive line 106 described in the second and the third embodiment may be of a flexible electrically conductive material, preferably of indium tin oxide. The drive line in the third embodiment can be further preferably of the same material as the light shielding layer (the conductive layer 103) to thereby lower a contact resistance.

Fourth Embodiment

Figure 8:
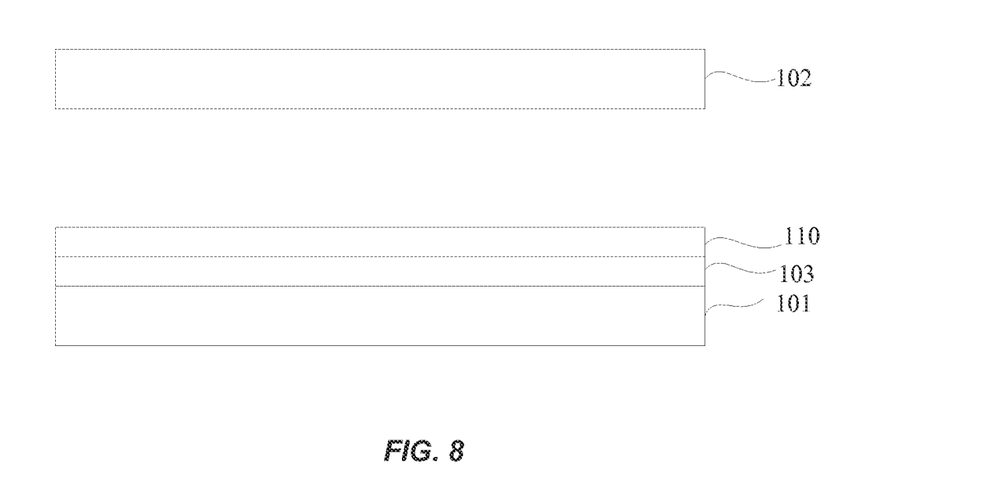
FIG. 8 is a schematic structural diagram of a touch screen structure according to a fourth embodiment of the invention.

This embodiment provides an in cell inductive touch screen as illustrated in FIG. 8, including a first substrate 101 and a second substrate 102 arranged in opposition to the first substrate 101. The in cell inductive touch screen further includes a conductive layer 103 on the inside of the first substrate 101, wherein the conductive layer 103 includes a plurality of helical-shaped first patterns and a plurality of inductive lines electrically connected with the first patterns, and the first patterns form inductive electrodes arranged in an array and output inductive signals through the plurality of inductive lines. The in cell inductive touch screen further includes a drive line on the inside of the first substrate 101, the drive line being electrically connected with the inductive electrodes to provide the in cell inductive touch screen with a drive signal. Particularly the first substrate 101 is an array substrate.

The difference between this embodiment and the second embodiment or the third embodiment is that the first substrate 101 in this embodiment is an array substrate, that is, the conductive layer 103 is on the inside of an array substrate, while in the second or third embodiment, the first substrate 101 is a color film substrate, that is, the conductive layer 103 is on the inside of a color film substrate. A particular structure of the conductive layer 103 is the same as that in the second embodiment or the third embodiment, and a repeated description thereof will be omitted here.

In this embodiment, a thin film transistor array 110 is further included on the inside of the first substrate 101, and the conductive layer 103 can be closer to the second substrate 102 than the thin film transistor array 110, or alternatively as illustrated in FIG. 8 in which the thin film transistor array 110 is closer to the second substrate 102 than the conductive layer 103. Particular location relationship of the conductive layer 103 relative to the other structure will not be limited in the embodiment.

It shall be noted that the foregoing embodiments include features which can be used for mutual reference and in combination. Although the invention has been disclosed above in the discussed embodiments, they are not intended to limit the invention, and any skilled in the art, without departing from the essential and scope of the invention, can make various variations and modifications to the technical solution of the invention in light of the method and technical disclosure as above, and accordingly any modifications, equivalent variations and adaptations made to the foregoing embodiments in light of the technical essence of the invention shall come into the scope of the technical solution of the invention.

What is claimed is:

1. An inductive touch screen, comprising:
    a transparent substrate;
    a conductive layer on the transparent substrate,
    wherein the conductive layer comprises:
        a plurality of helical-shaped first patterns, and
        a plurality of inductive lines electrically connected with the first patterns, and wherein the first patterns form inductive electrodes arranged in an array and output inductive signals through the plurality of inductive lines, wherein the plurality of inductive lines comprise a plurality of first inductive lines and a plurality of second inductive lines electrically insulated from the first inductive lines, wherein the array of inductive electrodes comprises a plurality of rows of first sub-electrodes and a plurality of rows of second sub-electrodes, wherein the first sub-electrodes and the second sub-electrodes are induction coils and are arranged alternately in a column direction, wherein each of the first inductive lines is electrically connected with a row of the first sub-electrodes, wherein each of the second inductive lines is electrically connected with the second sub-electrodes in a same column, wherein the touch screen further comprises a drive line on the transparent substrate, and wherein the drive line is electrically connected with the inductive electrodes to provide the touch screen with a drive signal.

2. The inductive touch screen according to claim 1, wherein each of the inductive electrodes has two terminals, one of which is electrically connected with an inductive line, and the other of which is electrically connected with the drive line.

3. The inductive touch screen according to claim 1, wherein one terminal of each of the inductive lines is connected with an amplification circuit and further with a detection circuit.

4. The inductive touch screen according to claim 1, wherein the drive line comprises a plurality of sub-drive lines, each of the sub-drive lines is electrically connected with a row of the first sub-electrodes and a row of the second sub-electrodes, and a different row of the first sub-electrodes or the second sub-electrodes is electrically connected with a different sub-drive line.

5. The inductive touch screen according to claim 1, wherein the drive line is connected with an external voltage signal or grounded.

6. An in cell inductive touch screen, comprising:
    a first substrate;
    a second substrate arranged in opposition to the first substrate;
    a conductive layer on an inner side of the first substrate, the conductive layer comprising a plurality of helical-shaped first patterns and a plurality of inductive lines electrically connected with the first patterns, wherein the first patterns form inductive electrodes arranged in an array and configured to output inductive signals through the plurality of inductive lines, wherein the plurality of inductive lines comprise a plurality of first inductive lines and a plurality of second inductive lines electrically insulated from the first inductive lines, wherein the array of inductive electrodes comprises a plurality of rows of first sub-electrodes and a plurality of rows of second sub-electrodes, wherein the first sub-electrodes and the second sub-electrodes are induction coils and are arranged alternately in a column direction, wherein each of the first inductive lines is electrically connected with a row of the first sub-electrodes, wherein each of the second inductive lines is electrically connected with the second sub-electrodes in a same column; and
    a drive line on the inner side of the first substrate, the drive line being electrically connected with the inductive electrodes to provide the in cell touch screen with a drive signal.

7. The in cell inductive touch screen according to claim 6, wherein the in cell inductive touch screen further comprises:
    a light shielding layer on the inner side of the first substrate, wherein the light shielding layer is electrically insulated from the conductive layer, wherein
    a projection of the conductive layer in a light transmission direction falls into an area occupied by the light shielding layer.

8. The in cell inductive touch screen according to claim 6, wherein the conductive layer is a light shielding layer, wherein the conductive layer further comprises a plurality of second patterns electrically insulated from the first patterns and the inductive lines, wherein the in cell inductive touch screen further comprises an insulation layer covering the conductive layer, and wherein the drive line is located on the insulation layer and electrically connected with the inductive electrodes through via holes in the insulation layer.

9. The in cell inductive touch screen according to claim 8 further comprising color films on the insulation layer.

10. The in cell inductive touch screen according to claim 7, wherein the light shielding layer comprises metal.

11. The in cell inductive touch screen according to claim 8, wherein the light shielding layer comprises metal.

12. The in cell inductive touch screen according to claim 7, wherein the drive line comprises the same material as the light shielding layer or comprises indium tin oxide.

13. The in cell inductive touch screen according to claim 8, wherein the drive line comprises the same material as the light shielding layer or comprises indium tin oxide.

14. The in cell inductive touch screen according to claim 6, wherein the first substrate is an array substrate.

* * * * *